United States Patent

Hayes

[15] 3,643,075

[45] Feb. 15, 1972

[54] DIGITAL SIMULATION

[72] Inventor: William F. Hayes, Dallas, Tex.

[73] Assignee: Texas Instruments Incorporated, Dallas, Tex.

[22] Filed: Dec. 2, 1970

[21] Appl. No.: 221

[52] U.S. Cl. ......................235/151, 343/100 SA, 235/150.1

[51] Int. Cl. ......................................G06f 15/20, G01s 3/72

[58] Field of Search ...............235/151, 150.1, 152; 343/114, 343/114.5, 700, 175, 100 SA, 100 CS, 768, 777, 854; 325/41–42, 323, 473; 328/38–39; 340/146.2, 348–349

[56] References Cited

UNITED STATES PATENTS

| | | | |
|---|---|---|---|
| 3,124,799 | 3/1964 | Hagedorn et al. | 343/114 X |
| 3,495,076 | 2/1970 | Jespers et al. | 340/146.2 X |
| 3,518,415 | 6/1970 | Gutleber | 325/42 X |
| 3,214,700 | 10/1965 | Hook | 325/323 X |
| 3,489,853 | 1/1970 | Lang | 340/349 X |
| 3,493,874 | 2/1970 | Finkel et al. | 235/152 UX |
| 3,474,447 | 10/1969 | Melancon | 343/100 |

*Primary Examiner*—Eugene G. Botz
*Assistant Examiner*—Jerry Smith
*Attorney*—Samuel M. Mims, Jr., James O. Dixon, Andrew M. Hassell, Harold Levine, Rene E. Grossman, John Vandigriff, Mel Sharp and Richards, Harris and Hubbard

[57] ABSTRACT

Digital data in the form of a bit pulse train from a phase shift generator is divided into a primary bit part and a remainder code. The remainder code is examined in correction code logic circuitry to determine the addition of a selected phase increment to the primary bit part of the phase shift digital data. If the remainder code falls within predetermined limits, a random addition of the selected phase increment will be made. The mean value of a large number of random additions is based on the value of the remainder code. Timing pulses to the correction code logic circuitry advances the digital representation of the phase increment through a half adder along with the primary bit part to simulate a bit code of higher order. This bit code is applied to an enabled gate connected to the phase shift network of an element of a phased array antenna.

16 Claims, 6 Drawing Figures

INVENTOR:
WILLIAM F. HAYES

INVENTOR
WILLIAM F. HAYES

INVENTOR
WILLIAM F. HAYES

DIGITAL SIMULATION

This invention relates to a digital data correction and more particularly to digital data correction for minimizing quantization errors and improving beam steering accuracy of a phased array antenna.

Digital phase shifters used with a phased array antenna frequently result in a periodic phase error across the array. This periodic error causes high side lobes (quantization side lobes) and pointing inaccuracy. Heretofore, some attempts have been made to improve the pointing accuracy and reduce the quantization side lobes of a phases array antenna by increasing the number of bits in the phase shift code; however, due to the implementation of required to increased the number of phase shift bits, this often proves to be impractical.

Since both the pointing inaccuracy and the quantization sidelobes are caused by the periodic error, they can be minimized by interrupting the period of the error. Several techniques have been considered in an attempt to minimize the effects of the phase quantization on the performance of a phased array antenna. One technique which has previously been used to improve the performance of a phased array antenna uses two quantizing rules. One rule is applied for one set of elements in the array and another rule for the remaining or alternate elements. The disadvantage of this approach is that two quantizing rules are required which increases the complexity of implementing the technique. Another means of breaking up the periodic error is to add an appropriate fixed analog quadratic phase distribution prior to the digital phase shifters. The quadratic phase addition is then removed with digital phasors and the resulting error across the array is no longer periodic. This condition naturally arises for space fed arrays; however, for corporate fed arrays, the quadratic phase must be built into the power distribution network. This results in added complexity to the array which is undesirable.

An object of this invention is to provide apparatus for minimizing the quantization side lobes of a radiation pattern from a phased array antenna. A further object of this invention is to provide apparatus for minimizing the pointing inaccuracy of an energy beam from a phased array antenna. Another object of the present invention is to provide apparatus for minimizing the periodic phase error across a phased array antenna. Still another object of this invention is to provide apparatus for randomly adding a set phase increment to a phase shift code. A still further object of this invention is to provide apparatus for interrupting the periodic error across a phased array antenna.

In accordance with this invention, digital data in the form of a pulse train and representing a desired number is divided into a primary bit part and a remainder code. A correction code of a selected value is added to the primary code if the remainder code falls within preestablished limits. The correction code may be a single pulse representing a desired value that is randomly generated at varying intervals. The randomly generated correction code, when added to a large number of primary codes, improves the overall accuracy of a large sample, with each data word having a bit length on the order of the primary part.

In accordance with another embodiment of this invention, an energy beam of a phased array antenna is accurately and smoothly steered by dividing a steering code representing a desired phase angle for the transmitted and received energy of an element of the antenna array into a primary bit part and a remainder code. If the remainder code is within a preselected range, a randomly generated digital representation of an angle increment (correction code) is added to the primary bit part. The result is a corrected steering code. When added to a large number of primary parts, the randomly generated angle increment improves the steering accuracy of a phased array antenna. The individual steering codes are applied to a phase shifter connected to one element of the antenna array.

A more complete understanding of the invention and its advantages will be apparent from the specifications and claims and from the accompanying drawings illustrative of the invention.

Referring to the drawings.

Figure 1:
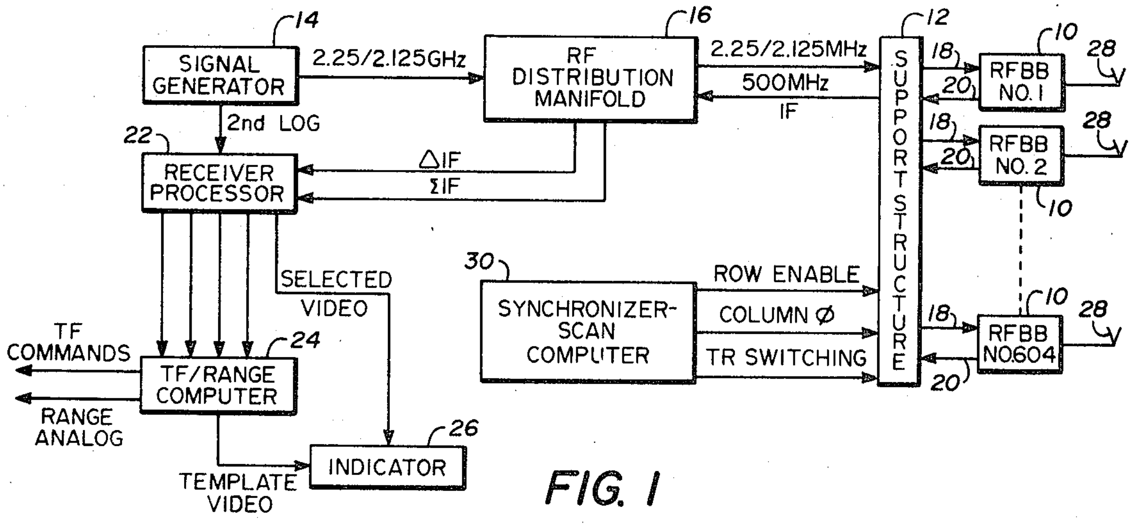
FIG. 1 is a highly simplified block diagram of a radar system in which the apparatus of the present invention may be used.
Figure 2:
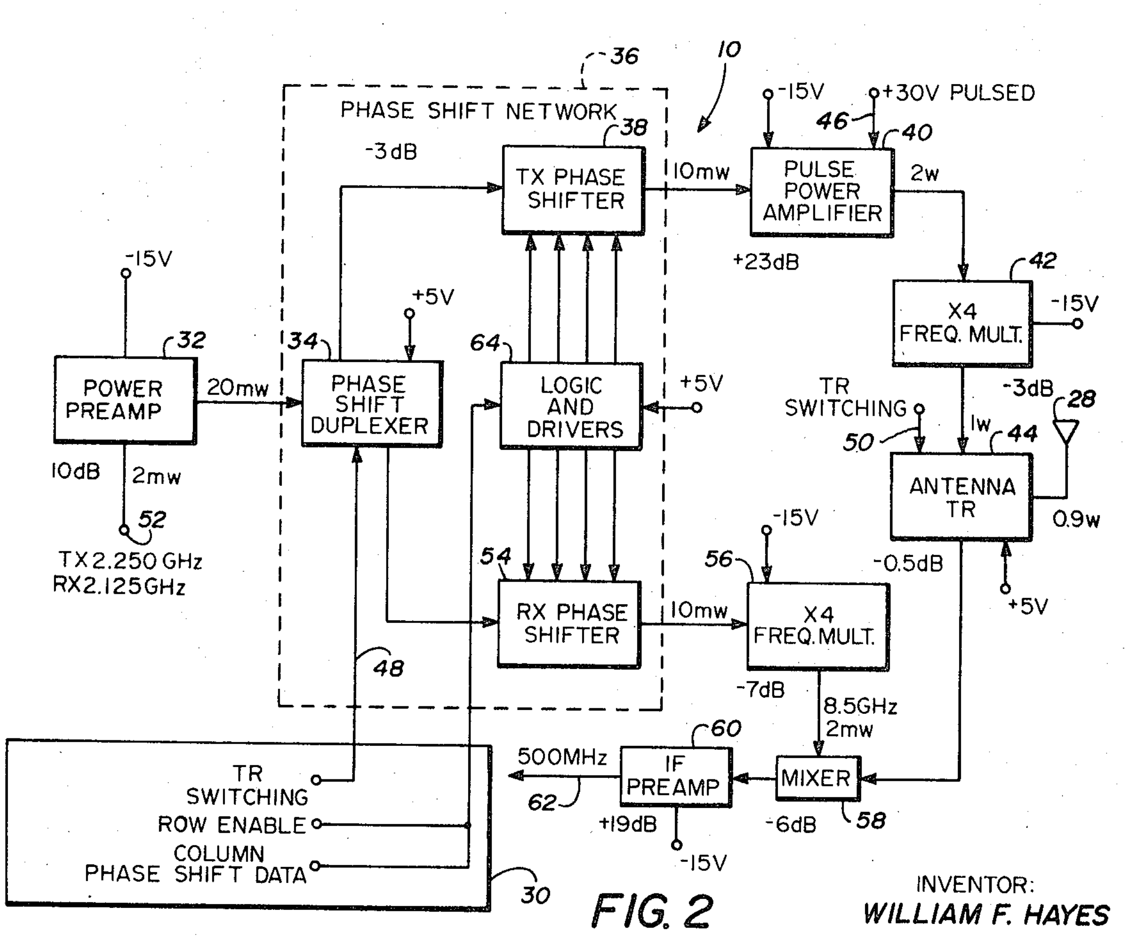
FIG. 2 is a block diagram of an antenna element building block module including a phase shift network.

Referring to FIGS. 1 and 2, there is shown a conventional modular integrated electronics radar system having an antenna array and employing phase shifting techniques for causing beam scanning. Each of the modules 10 (radiofrequency building blocks) is adapted to be plugged into a support structure indicated by the reference numeral 12 in the schematic block diagram of FIG. 1. A signal generator 14 produces an RF radar carrier signal, for example, centered about 2.25 gHz for transmitting, and a local oscillator signal centered about 2.125 gHz. These signals are applied to a distribution manifold 16 which distributes the energy in a uniform manner to each of the modules 10. This is achieved by a single coaxial channel 18 for each module.

Each module 10 has a single coaxial output 20 which connects to the distribution manifold 16 and carries a 500 MHz intermediate frequency signal. The distribution mainfold 16 then supplies the summed IF signals via two channels to a receiver processor 22 which provides the various video information to a range computer 24 and to an indicator 26. Each RFBB module 10 has a radiating antenna element 28 which transmits and receives RF energy (for example, at 9 gHz) as will hereinafter be described in greater detail.

The beam transmitted from the array of antenna elements 28 may be scanned both vertically and horizontally as desired by controlling the relative phase of the RF energy radiated from the antenna elements 28. Each module 10 includes a phase shift network for shifting the phase relationship of the transmitted RF carrier and the local oscillator so that a beam of microwave energy may be radiated in a desired direction and the direction of the returning echoes determined. A synchronizer and scan computer 30 operates the phase shift networks of the various modules in the manner necessary to achieve the desired scanning, and also provides the transmit and receive cycle control timing pulses. These signals are at a sufficiently low frequency to be treated essentially as DC signals and therefore require no coaxial transmission line connections with the individual modules.

Referring now to FIG. 2, each of the modules 10 is comprised of a power preamplifier 32 which receives the 2.25 gHz signal during the transmit cycle, and the 2.125 gHz signal during the receive cycle. These signals are applied to a duplexer 34 in the phase shift network 36 which routes the 2.25 gHz signal through a transmit phase shifter 38. The phase shifter 38 shifts the phase of the 2.25 gHz signal in accordance with the position of the module in the array and the angle of the beam being transmitted by the overall antenna unit. The 2.25 gHz signal is then applied to the input of a pulse amplifier 40. The output of the amplifier 40 is coupled through a frequency quadrupler 42 and an antenna TR switch 44 to the antenna element 28.

The transmit cycle is defined by the presence of a +30-volt pulse on an input 46 to the amplifier 40, input 48 to the phase shift duplexer 34, and the input 50 to the antenna TR switch 44. The absence of the +30-volt pulse defines the receive cycle.

During the receive cycle, the 2.125 gHz signal on an input 52 is fed through the power preamplifier 32, and is switched by the phase shift duplexer 34 to the local oscillator channel including a receive phase shifter 54 and a second frequency quadrupler 56 to produce an 8.5 gHz (based on the previous values) local oscillator injection voltage for a mixer 58. During the receive cycle, RF signals developed on the antenna element 28 are directed by the antenna TR switch 44 to the mixer 58. The difference of the RF signal and the local oscillator signal is then applied to the IF preamplifier 60 which produces a 500 MHz intermediate frequency signal at an output 62.

Both phase shifters 38 and 54 are operated by the same logic circuit 64 which is incorporated in the module 10. Row enable and column phase shift data are provided by the synchronizer and scan computer 30.

Figure 3:
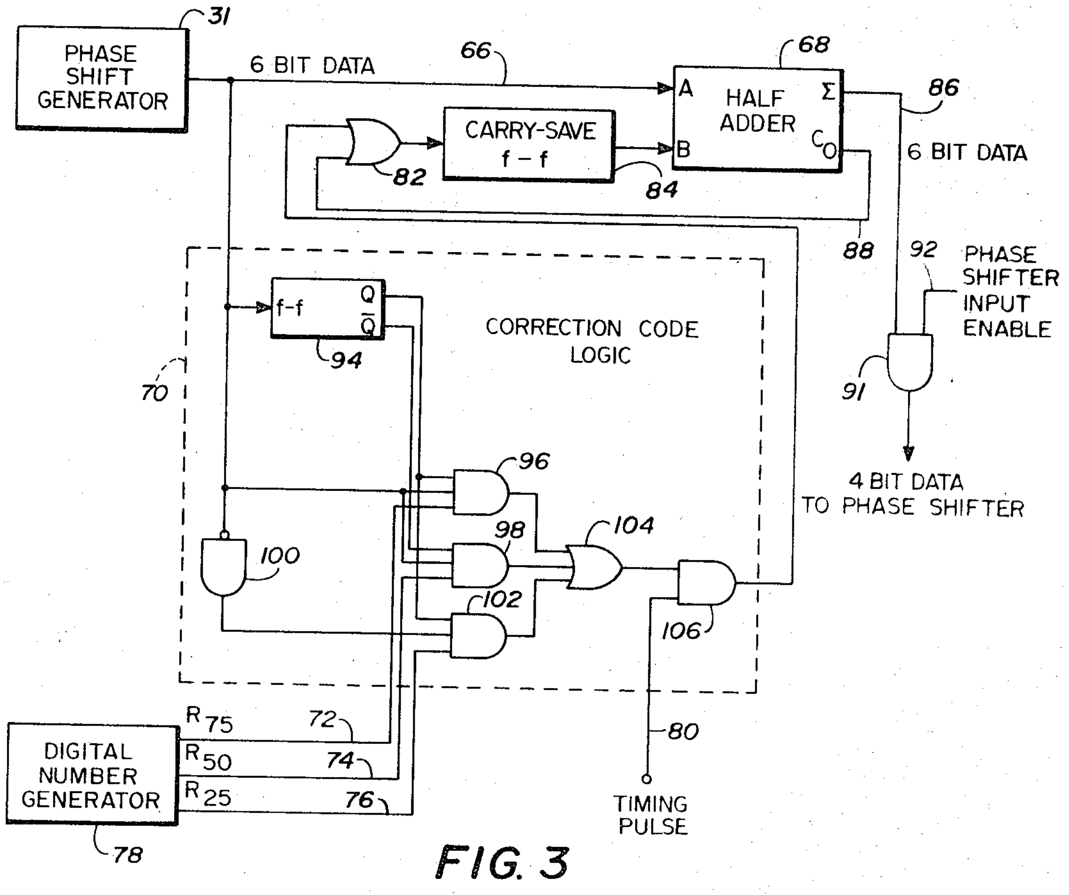
FIG. 3 is a block diagram of a system for six-bit simulation using a four-bit phase shifter.

Referring to FIG. 3, the logic circuit for the scan computer 30 is shown in greater detail. A phase shift generator 31 generates a digital data phase shift code on a line 66 that is applied to the A input terminal of a half adder 68 and the input of a correction code logic circuit 70. Additional inputs to the logic circuit 70 are randomly generated digital codes on lines 72, 74 and 76 as the output of a digital random number generator 78. Number generator 78 produces a preselected phase increment as a correction code on the lines 72, 74 and 76. As explained, this phase increment correction code may be a single pulse that randomly appears on the output lines. The number of times in a given period the phase increment appears on each of the lines varies. The letter R with the subscript indicates the number of times a correction code appears for a given period. For example, a correction code appears on line 72 on the average for three out of four pulses produced by the generator 78. On line 74, a correction code appears on the average for half the pulses produced at the generator 78. On line 76, a correction code appears 25 percent of the time.

Timing pulses are also applied to the logic circuit 70 over a line 80. Timing pulses on the line 80 may be generated by the phase shift generator 31. A correction code at the output of the logic circuit 70 is applied to one input of an OR-gate 82 having an output connected to the input of a carry-save flip-flop 84. A digital code at the output of the flip-flop 84 is applied to the B input terminal of the half adder 68.

Half adder 68 is a conventional circuit producing a sum code on line 86 and a carry code on line 88. The sum code on line 86 is applied to one input of an AND-gate 90 having a second input as an enable pulse on line 92. The carry code on line 88 is applied to the second input of the OR-gate 82.

Operationally, assume the generator 31 generates a code defining the exact phase desired for a particular antenna element 28. If the code is in the form of a six-bit data word, all six-bits are applied to the A input terminal of the half adder 68 and to the logic circuit 70. In the logic circuit 70, the six-bits are connected to a flip-flop 94, and AND-gate 96, an AND-gate 98 and an AND-gate 100. In addition to the six-bit data word, the AND-gate 96 has one input connected to one output of the flip-flop 94 and one input connected to one output of the number generator 78 by the line 72. The AND-gate 98 connects to the "NOT" terminal of the flip-flop 94 and to the generator 78 by the line 74. The output of the AND-gate 100 connects to an AND-gate 102 which also has inputs from the flip-flop 94 and the number generator 78 by the line 76. Each of the AND-gates 96, 98 and 102 have an output tied to an OR-gate 104 which connects to an AND-gate 106. The second input to the AND-gate 106 is the timing pulses on line 80; the output is the correction code connected to the OR-gate 82.

Figure 4:
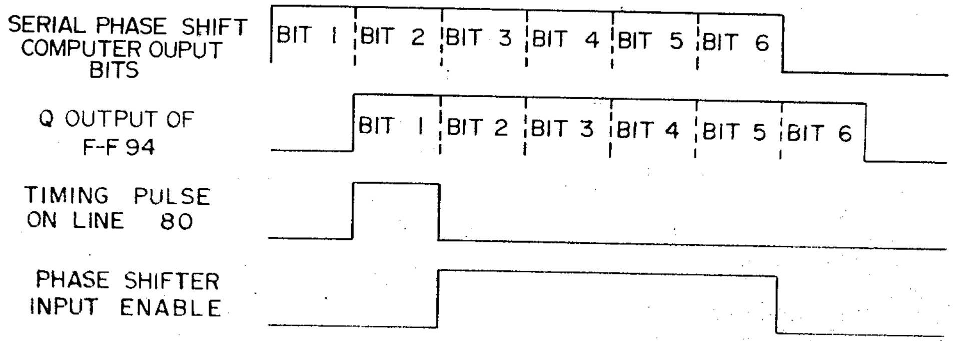
FIG. 4 is a timing diagram for the six-bit simulation implementation of FIG. 3.

Timing pulses on the line 80 enable only the correction code that is generated for the correct set of data bits (i.e., the first and second bits in the six-bit data word) into the carry-save flip-flop 84 through the OR-gate 82. As illustrated by the timing diagram of FIG. 4, the correction code appears at the input of the carry-save flip-flop 84 during the time when the second data bit is present at the A input terminal of the half adder 68. Due to the relay introduced by the carry-save flip-flop 84, a correction code from the AND-gate 106 appears at the B input terminal of the half adder 68 when the third data bit is present at the A input terminal of the half adder. By operation of the half adder 68, the output carry on line 88, which has previously been at a logic "0" level, now depends on the value of the third data bit and the correction code. The carry pulse on line 88 will be stored in the carry-save flip-flop 84 for the next serial add operation. The sum code on line 86 from the half adder 68 is coupled to the AND-gate 91. The phase shift input enable pulse on line 92 allows only word bits three through six to be transmitted to the phase shifter through the AND-gate 91. The word bits three through six generated by the generator 31 now contain the proper phase increment addition to produce a phase shift code in four bits which simulates for a large number of generated codes the accuracy obtainable by a six-bit code.

Figure 5:
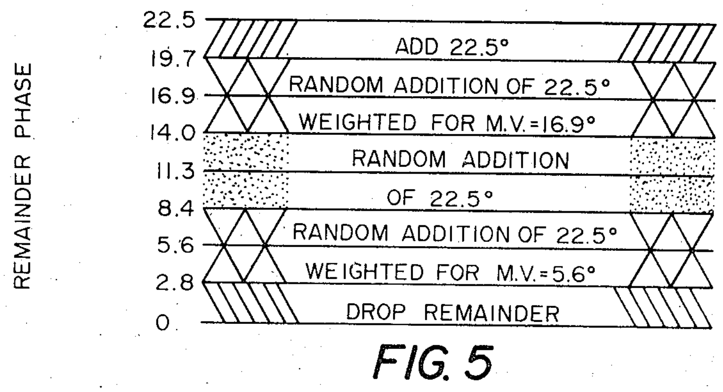
FIG. 5 is a chart showing the addition of a randomly generated 22,5° phase increment, the frequency of the random generation of the phase increment depending on the magnitude of a remainder phase.

To more fully understand the operation of the system of FIG. 3, consider the chart of FIG. 5 and the following analysis. The phase value desired for a particular element is truncated to the closest phase shift bit which is a multiple of:

$$\phi = 360^\circ/_2B \quad (1)$$

where $B$ is the bit size of a phase shift network. The remainder term resulting from the truncation of the desired data word is examined to determine whether or not another phase increment, $\phi$, should be added to the truncated value. In order to simulate a phase shift network having $B_s$ bits, the remainder term is examined. If the remainder term in in the interval:

$$I_0 - \left[ 0^\circ, \frac{360^\circ}{2^{(B_s+1)}} \right] \quad (2)$$

then no additional phase is added, If the remainder is in the interval:

$$I_l = \left[ \frac{360}{2^{B_s}} (l-1/2), \frac{360}{2^{B_s}} (l+1/2) \right] \quad (3)$$

$$\text{for } l = 1 \text{ to } [2^{(B_s-B)} - 1],$$

then an addition of a randomly generated phase increment is made. The addition is weighted such that for a large number of remainders in this interval a mean value of the added phase is:

$$\phi t = \frac{360}{2^{B_s}} l \quad (4)$$

If the remainder is greater than:

$$360 \left[ \frac{1}{2^B} - \frac{1}{2^{B_s-1}} \right] \quad (5)$$

then an additional phase increment is added.

Using as an example a four-bit phase shifter to simulate a six-bit code, the remainder is examined on the basis of the divisions given in FIG. 5.

If the remainder code represents a phase angle between 0° and 2.8°, then the remainder is dropped, For a remainder code between 2.8° and 8.4°, an addition of a code representing 22.5° is randomly made to produce a weighted mean value of 5.6° added to the primary bit part code for a large number of generated numbers. If the remainder is between 8.4° and 14.0°, an addition of 22.5° is randomly made to the truncated value. For a remainder code representing a phase of between 14.0° and 19.7°, an addition of 22.5° is randomly made to produce a weighted mean value of 16.9° added to the truncated value. For a remainder above 19.7°, an addition of 22.5° is made to the truncated value.

REferring again to FIG. 3, the number generator 78 produces the correction code to be added to the primary bit part of a generated code. The pulses on the line 72, as connected to the AND-gate 96, establishes the random addition of a phase increment when the remainder phase is between 14.0° and 19.7°. Pulses on the line 74 determine the random addition of 22.5° to the truncated value when the remainder code represents a phase between 8.4° and 14.0°. Generated pulses on the line 76, as connected to the AND-gate 102, establish a weighted mean value of 5.6° for addition to the primary bit part for a remainder code between 2.8° and 8.4°.

Figure 6A:
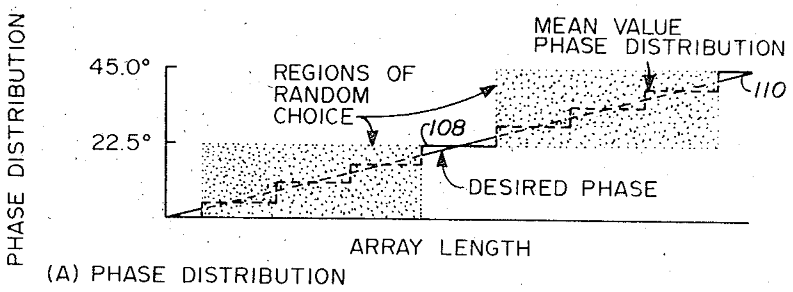
FIGS. 6A and 6B are plots of phase distribution and phase error, respectively, versus array length for illustrating the improvement achieved by apparatus of the present invention.
Figure 6B:
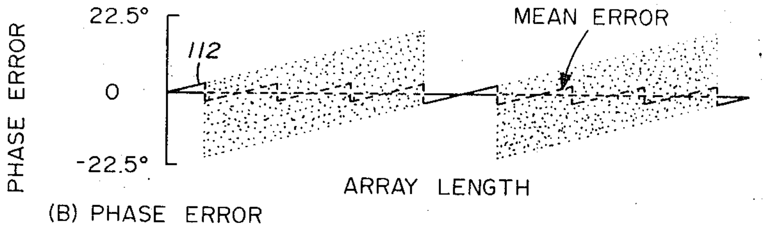

Referring to FIGS. 6A and 6B, the mean value of the phase distribution and phase error is illustrated for an electronically scanned array. Referring particularly to FIG. 6A, the stippled regions outline the phase distribution resulting from the addition of a randomly generated correction code in accordance with the present invention. By adding a randomly generated phase increment to the truncated value of a data word, the mean value of the phase distribution is given by the stairstep curve as identified by the numeral 108. This curve varies from the desired phase as given by the line 110 by a considerably smaller amount than previously obtainable. Another way of observing the improvement achieved by random addition is illustrated in FIG. 6B. Without the random addition to produce a mean value, the phase error varies between −11.25° and +11.25°. With the random addition, the mean error varies as indicated by the sawtooth curve, identified by the numeral 112, between −2.8° to +2.8°.

Using the same concept (although not necessarily the same equations as given above), simulation of phase control granularity in between bit sizes may be obtained. As the simulated bit size increases, the performance becomes better; however, the implementation becomes more complex. The additional complexity results, since, for each additional simulated bit size, an additional mean value of random phase must be generated.

The random addition of a phase increment may also be used to simulate an analog phase shifter. As the number of intervals in the remainder term approaches infinity, the digital phase shifter approaches the performance of an analog shifter.

The basis of the randomization of a phase shift code is to make an appropriate random choice of the least significant bit rather than conventional roundoff or truncation. Using a six-bit simulation as an example, the phase required for each element is determined by the steps of; first, the exact phase desired for the element is computed and then truncated to a 22.5° increment. Second, the remainder term is examined to determine the interval of FIG. 5 in which it falls. Third, the appropriate random choice of the last bit is taken from the random bit number generator 78 and added to the truncated phase. For a large array of antenna elements 28, the last bit average is such that the phase shifter appears to have a six-bit (5.6°) quantization.

While only preferred embodiments of the invention, together with modifications thereof, have been described in detail herein and shown in the accompanying drawings, it will be evident that various further modifications are possible without departing from the scope of the invention.

What is claimed is:

1. Apparatus for reducing the mean periodic error induced in a digital simulation of a continuous signal due to quantization, comprising in combination:

a. means for generating a plurality if first multibit digital data words each representing a single value of said continuous signal;

b. means for truncating each of said digital data words, to produce a plurality of primary bit parts and remainder codes;

c. means for randomly generating a plurality of digital codes with each of said digital codes representing a selected value to be added to a selected primary part, selected members of said digital codes having a weighted mean value determined by selected members of said remainder code; and d. means for adding selected members of said digital codes to selected members of said plurality of primary parts thereby producing a plurality of second digital words comprising a digital simulation of said continuous signal, each of said second digital words having a bit length on the order of said primary parts, said digital simulation having a mean periodic error below a predetermined value.

2. The apparatus of claim 1 wherein said continuous signal is a beam steering signal to a phased array antenna in which each of said multibit digital words is a digital code which determines the phase angle of the energy radiated by one element of said array.

3. Apparatus for minimizing the mean periodic error of a digital code from a desired value as set forth in claim 1 wherein if the remainder code in in the interval:

$$I_l=\left[\frac{360}{2^{B_s}}(l-1/2),\ \frac{360}{2^{B_s}}(l+1/2)\right]$$

$$\text{for } l=1 \text{ to } [2^{(B_s-B)}-1]$$

then an appropriate random addition of the generated code is made.

4. Apparatus for steering the transmitted and received energy of a phased array antenna comprising:

means for generating a plurality of digital codes, each of said codes representing a desired phase angle for an element of said antenna array;

means for dividing said digital codes into primary bit parts and remainder codes;

means for determining if each of said remainder codes are within preselected ranges;

means for adding a randomly generated digital code representing an angle increment to selected primary bit parts to produce a phase steering code for each element of said array such that the average mean periodic error of said steering codes is less than a predetermined value; and phase shift means responsive to said steering codes and connected to selected elements of said antenna array.

5. Apparatus for steering the transmitted and received energy of a phased array antenna as set forth in claim 4 wherein the primary bit part code represents a desired steering angle within 22.5° of the desired angle.

6. Apparatus for steering the transmitted and received energy of a phased array antenna as set forth in claim 5 wherein the number of randomly generated angle increments to be added to the primary bit part code is made based on the magnitude of the remainder code.

7. Apparatus for steering the transmitted and received energy of a phased antenna as set forth in claim 6 wherein the angle increment is a code representing an angle of 22.5°.

8. Apparatus for steering the transmitted and received energy of a phased array antenna as set forth in claim 4 wherein a random addition of an angle increment is made if the remainder code falls within the interval:

$$I_l=\left[\frac{360}{2^{B_s}}(l-1/2),\ \frac{360}{2^{B_s}}(l+1/2)\right]$$

$$\text{for } l=1 \text{ to } [2^{(B_s-B)}-1].$$

9. Apparatus for steering the transmitted and received energy of a phased array antenna comprising:

means for generating a digital code representing a desired phase angle for the radiation energy of each element of the antenna array;

means for dividing the digital code for each element into a primary bit part code and a remainder code, means for determining if the remainder code for each element of the antenna array falls within a preselected range, means for adding a randomly generated selected digital code representing an angle increment to the primary bit part of each element to produce a phase steering code for a particular element, and phase shift means for each element of the antenna array responsive to one phase steering code and connected to one element of the antenna array.

10. Apparatus for steering the transmitted and received energy of a phased array antenna as set forth in claim 9 wherein the random addition of the angle increment to the primary bit part code is made based on the magnitude of the remainder code.

11. Apparatus for steering the transmitted and received energy of a phased array antenna as set forth in claim 10 including means for randomly generating the angle increment code to be added to the primary bit part.

12. Apparatus for steering the transmitted and received energy of a phased array antenna as set forth in claim 11 wherein the randomly generated phase increment is added to the significant bit part for a particular element if the remainder code falls within the interval:

$$I_l = \left[ \frac{360}{2^{B_s}} (l - 1/2),\ \frac{360}{2^{B_s}} (l + 1/2) \right]$$

for $l = 1$ to $[2^{(B_s - B)} - 1]$.

13. Apparatus for steering the transmitted and received energy of a phased array antenna as set forth in claim 12 wherein the primary bit part code represents a steering angle within 22.5° of the desired steering code.

14. Apparatus for steering the transmitted and received energy of a phased array antenna as set forth in claim 13 wherein the angle increment of 22.5° is randomly added to the primary bit part of each element of the antenna array such that the random addition results in a mean value of 5.6° when the remainder is within the interval of 2.8° to 8.4°.

15. Apparatus for steering the transmitted and received energy of a phased array antenna as set forth in claim 14 wherein the angle increment of 22.5° is randomly added to the primary bit part of each element of the antenna array such that the random addition results in a mean value of 11.3° when the remainder is within the interval of 8.4° to 14..°.

16. Apparatus for steering the transmitted and received energy of a phased array antenna as set forth in claim 15 wherein the angle increment of 22.5° is randomly added to the primary bit part of each element of the antenna array such that the random addition results in a mean value of 16.9° when the remainder is within the interval of 14.0° to 19.7°.

* * * * *